United States Patent [19]

Sandel et al.

[11] Patent Number: 4,934,216
[45] Date of Patent: Jun. 19, 1990

[54] FOUR SPEED INLINE TRANSMISSION OVERDRIVE

[75] Inventors: Joseph L. Sandel, Dearborn Heights; Roy J. Garrett, Redford Township, Wayne County, both of Mich.

[73] Assignee: Ford Motor Company, Dearborn, Mich.

[21] Appl. No.: 336,144

[22] Filed: Apr. 11, 1989

[51] Int. Cl.$^5$ .............................................. F16H 57/10
[52] U.S. Cl. ................................ 475/59; 464/156; 464/901; 475/285; 475/346
[58] Field of Search .................... 74/730, 750 R, 762; 464/154, 156, 158, 901

[56] References Cited

U.S. PATENT DOCUMENTS

| | | | |
|---|---|---|---|
| 3,174,302 | 3/1965 | Pomper | 464/154 |
| 3,244,020 | 4/1966 | Breuer | 464/156 X |
| 4,226,123 | 10/1980 | Croswhite | 74/763 X |
| 4,331,044 | 5/1982 | Bookout et al. | 74/762 X |
| 4,347,765 | 9/1982 | Leonard et al. | 74/763 X |
| 4,650,428 | 3/1987 | Bland et al. | 464/156 X |
| 4,789,376 | 12/1988 | Grant | 464/154 |

Primary Examiner—Dirk Wright
Attorney, Agent, or Firm—Donald J. Harrington; Frank G. McKenzie; Keith L. Zerschling

[57] ABSTRACT

A hydrokinetic multiple ratio transmission having a compound planetary gearset with clutches and brakes that are selectively engageable and released to establish two underdrive ratios, a direct drive ratio and an overdrive ratio, as well as a reverse ratio, the clutches and brakes being operable by fluid pressure operated servos, the clutches and brakes for establishing the underdrive ratios and the direct drive ratios being disposed between the planetary gearing and a hydrokinetic torque converter, a friction clutch engageable for overdrive operation and disposed on the opposite side of the planetary gearing and two torque input shafts, one being concentrically disposed with respect to the other, the torque input shaft for overdrive operation being connected to torque input portion of the overdrive clutch through an intermediate shaft adapted for articulation to accommodate eccentricities between the bearing supports disposed on opposite sides of the planetary gearing.

6 Claims, 7 Drawing Sheets

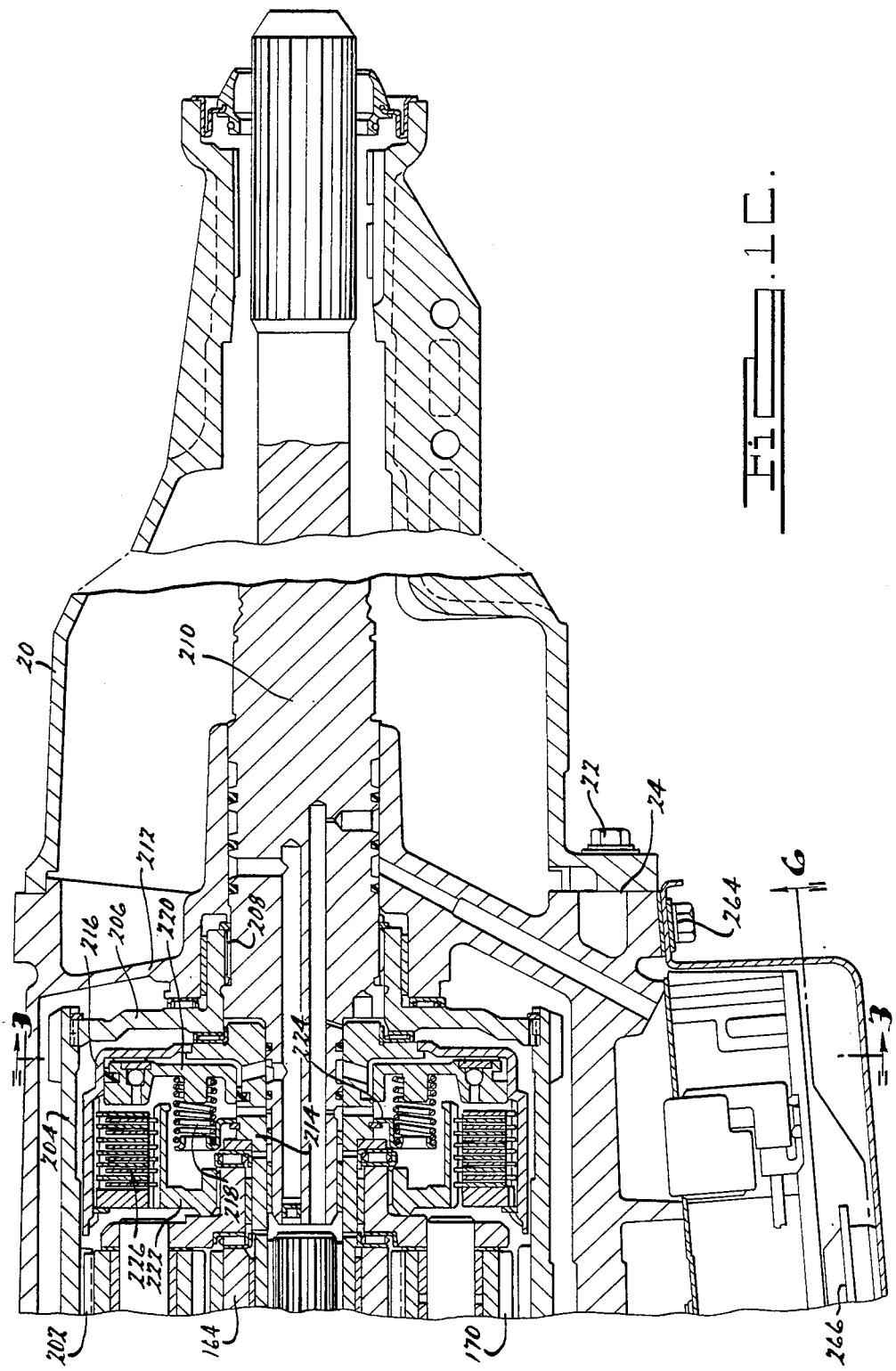

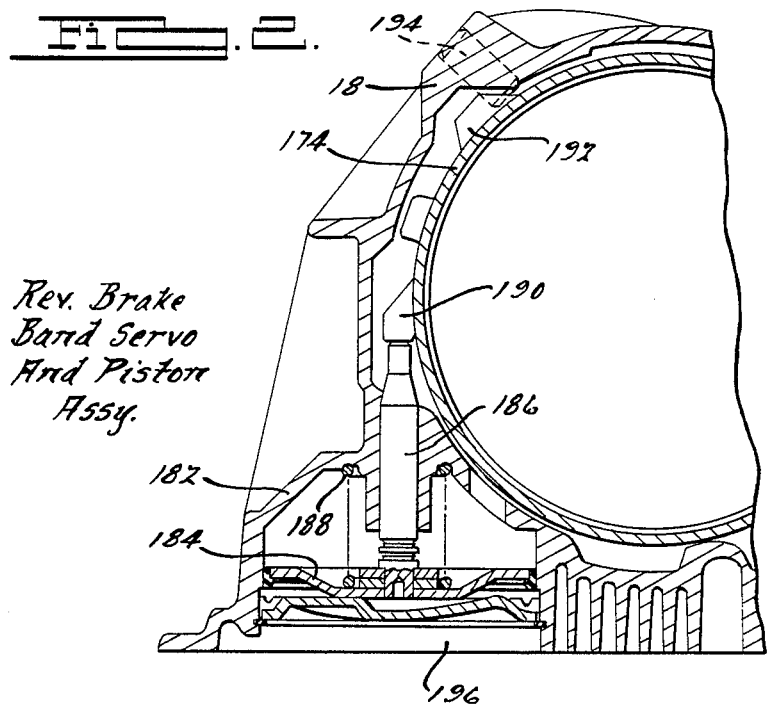
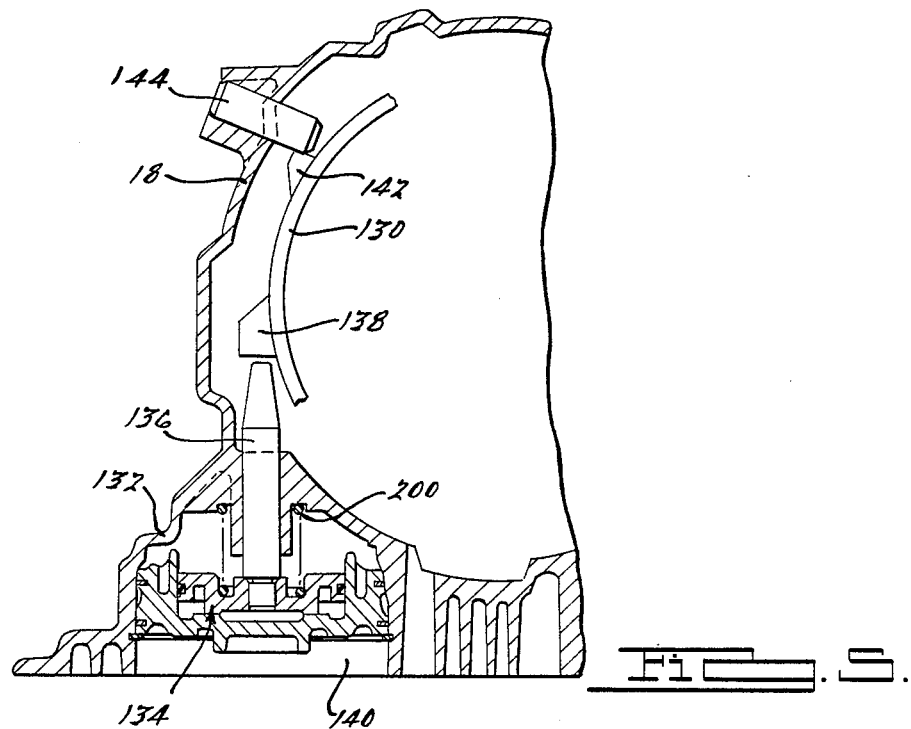

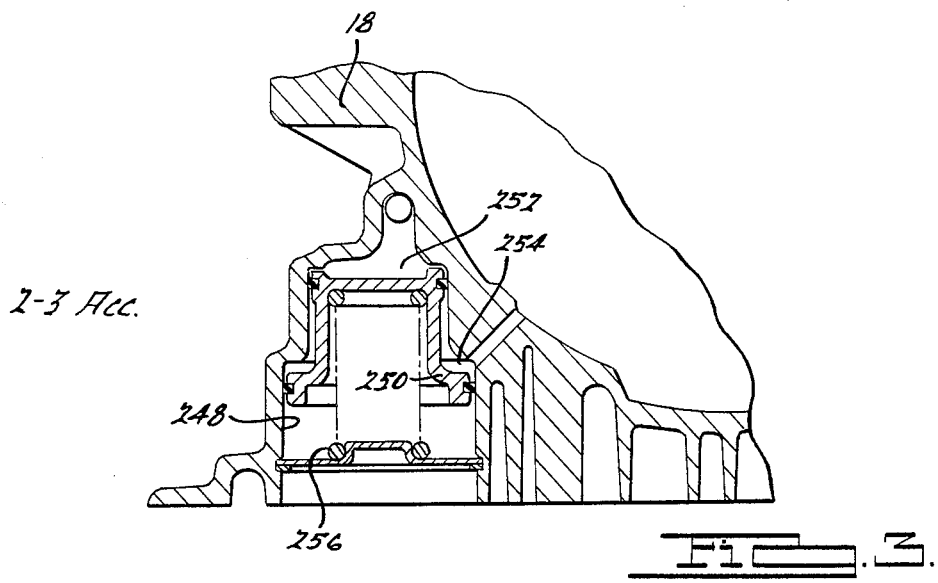
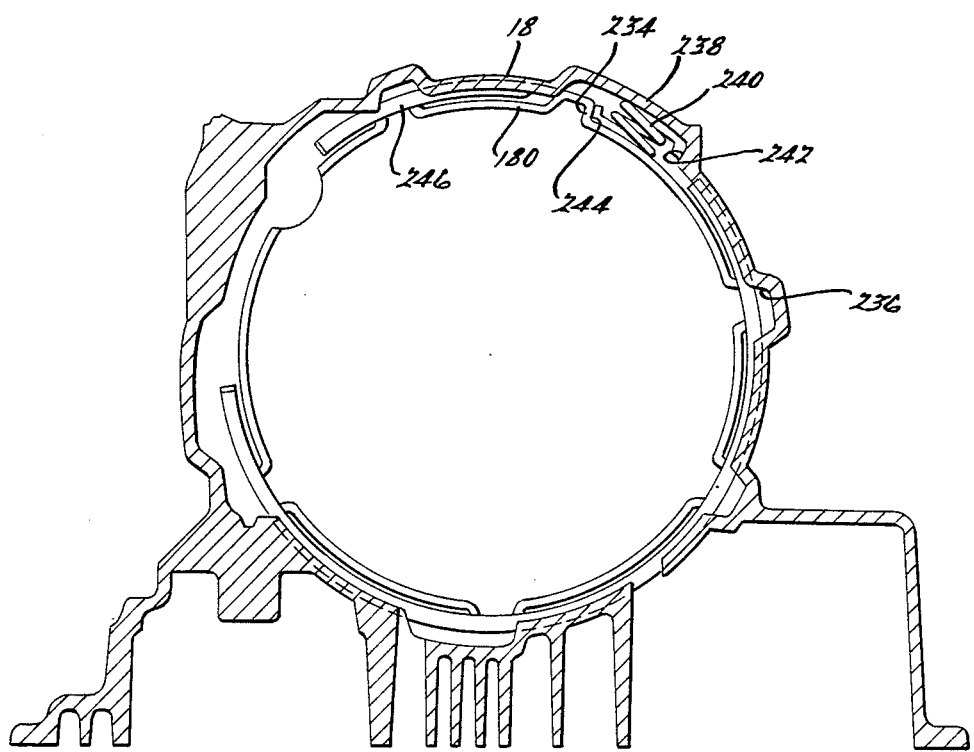

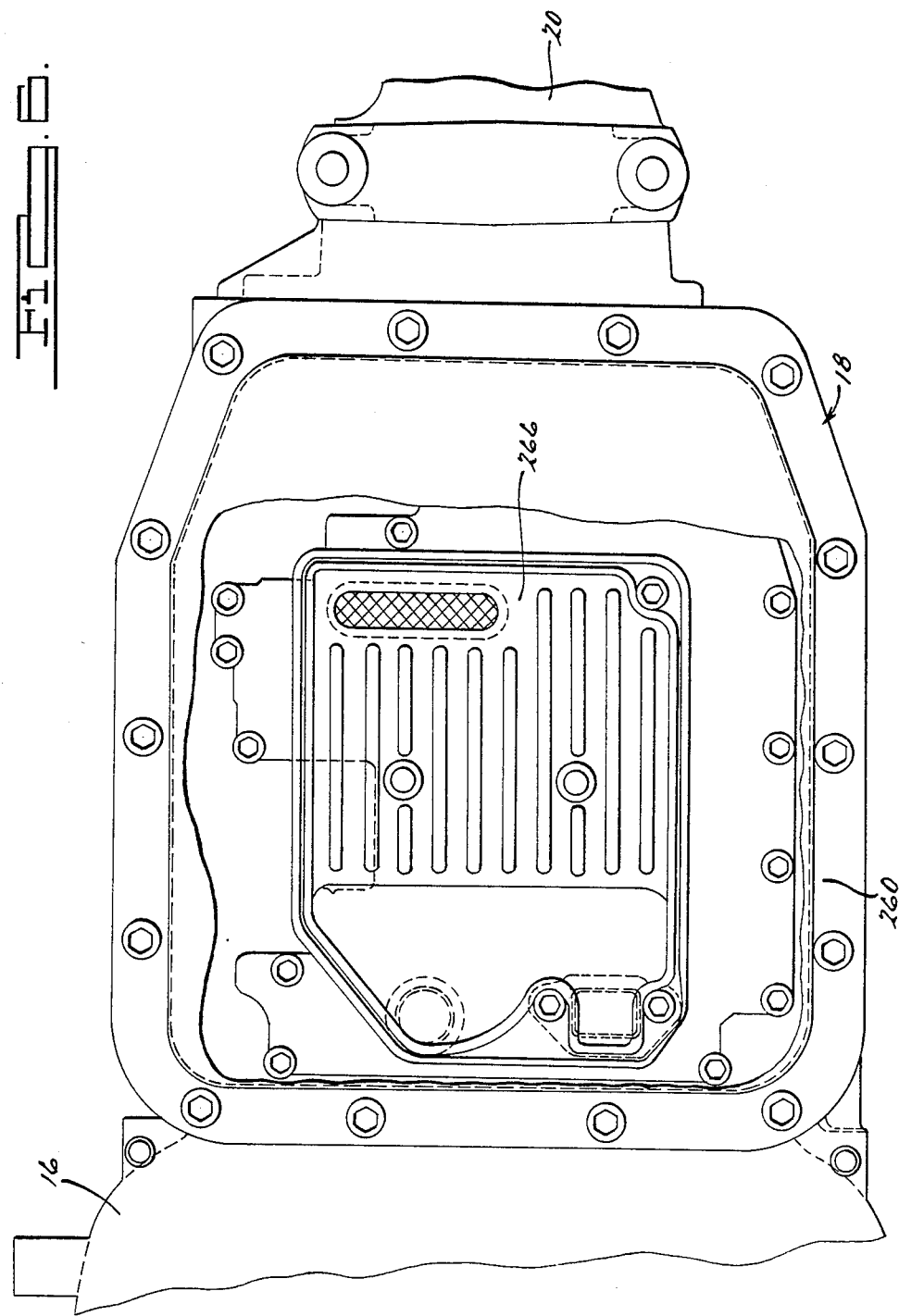

| | | B1 | B2 | C1 | C2 | C3 | C4 | C5 | C6 | Ratio | |
|---|---|---|---|---|---|---|---|---|---|---|---|
| 1st | M | X | | X | | | | X | | R2/S2 | 2.400 |
| | D | | | X | | | | X | X | R(S1+S2)/S2(R+S1) | 1.467 |
| 2nd | | X | | X | | | X | X | | 1.00 | 1.000 |
| 3rd | | | | X | | X | | X | | R/(R+S1) | .667 |
| 4th | | | X | X | | X | | | | | |
| Rev. | | | | | X | | | | X | R/S1 | 2.000 |

FOUR SPEED INLINE TRANSMISSION OVERDRIVE

BACKGROUND OF THE INVENTION

Our invention comprises improvements in a four speed ratio automatic transmission of the kind disclosed in U.S. Pat. No. 4,347,765, which is assigned to the assignee of this invention. It is adapted especially for use in automotive vehicles having a forwardly mounted engine and rear drive wheels.

The transmission disclosed in the '765 patent comprises a hydrokinetic torque converter and a Ravagineaux type compound planetary gear unit disposed within a common transmission casing and arranged co-axially to accommodate torque transfer from the crankshaft of an internal combustion engine to a coaxial output shaft. The output shaft and the axis of the engine crankshaft are arranged in an inline relationship with the output shaft being connected drivably to the rear traction wheels of the vehicle through a driveshaft and a differential and axle assembly.

The transmission mechanism of the '765 patent includes an overdrive clutch that is connected through a central shaft to a crankshaft driven impeller of a hydrokinetic torque converter. The overdrive clutch serves also as a direct drive clutch and is engaged during third speed ratio operation as well as in a fourth overdrive speed ratio drive mode. Following operation in the third speed ratio, the overdrive brake is applied thereby providing a reaction point for the larger of two sun gears in the Ravagineaux type gearset. Thus the carrier which serves as the output member drives the driven shaft at an overdrive ratio of approximately 0.67:1. During operation in the third speed ratio, the torque delivery from the engine to the driven shaft of the transmission has a split torque delivery path wherein part of the torque is distributed mechanically through a central shaft and the balance of the torque is distributed hydrokinetically through the torque converter, the turbine of the torque converter being connected to torque input elements of the Ravagineaux the gearset.

GENERAL DESCRIPTION OF THE INVENTION

In the improved four speed ratio transmission of our invention we have provided a Ravagineaux type gearset and a hydrokinetic torque converter as in the case of the transmission structure of the '765 patent. We also have provided an overdrive clutch located on the torque output side of the gearset. The torque converter, however, includes a modulated pressure operated, slipping bypass clutch which is used to establish a mechanical torque transfer from the torque converter impeller to the torque converter turbine when the clutch is active. Unlike the structure of the '765 patent, however, a central shaft serves as the sole torque delivery shaft from the hydrokinetic portions of the transmission to the planetary gearing portions. In contrast, the structure of the '765 patent has a sleeve shaft that connects directly the hub of the turbine of the torque converter to the torque input side of a reverse clutch and a forward clutch. The sleeve shaft of the transmission of the '765 patent serves solely as a torque input element for a direct and overdrive clutch on the torque output side of the transmission gearing.

The single torque input shaft of the transmission structure of our invention is connected to torque input elements of the overdrive clutch through an articulated coupling shaft arrangement that will permit slight misalignment between the axis of the bearing support for the clutches and the brakes located between the planetary gearing and the torque converter and the bearing support for the output shaft and the overdrive clutch. This greatly simplifies the machining operation and eliminates excessive bearing loads and undesirable force couples during torque delivery.

The intermediate shaft has only two bearing points, one at each end. The single torque input shaft also is characterized by two bearing points, one of which is common to the intermediate shaft. Likewise the output shaft has a bearing point that is common to the other bearing point of the intermediate shaft.

Because of the unique arrangement of the input shaft and the intermediate shaft of the transmission of our invention, the overdrive clutch located on the torque output side of the planetary gearing is not used during third speed ratio direct drive operation. Thus the transmission of the present invention does not feature a split torque delivery as in the case of the transmission of the '765 patent.

BRIEF DESCRIPTION OF THE FIGURES OF THE DRAWINGS

FIGS. 1A, 1B and 1C show in longitudinal cross-sectional form the overall transmission assembly of the present invention.

FIG. 2 is a transverse cross-sectional view taken along the plane of section line 2—2 of FIG. 1B which shows a reverse brake band servo and piston assembly.

FIG. 3 is a cross-sectional view taken along the plane of section line 3—3 of FIG. 1C which shows a 2-3 accumulator for cushioning ratio upshifts from the second ratio to direct drive ratio.

FIG. 4 is a cross-sectional view taken along the plane of section line 4—4 of FIG. 1B which shows an anti-backlash planet support assembly.

FIG. 5 is a cross-sectional view taken along the plane of section line 5—5 of FIG. 1B, which shows the transmission clutches and brakes, including the intermediate brake servo.

FIG. 6 is a view as seen from the plane of section line 6—6 of FIGS. 1B and 1C, which show the oil pan and sump of assembly.

PARTICULAR DESCRIPTION OF THE INVENTION

Figure 1A:
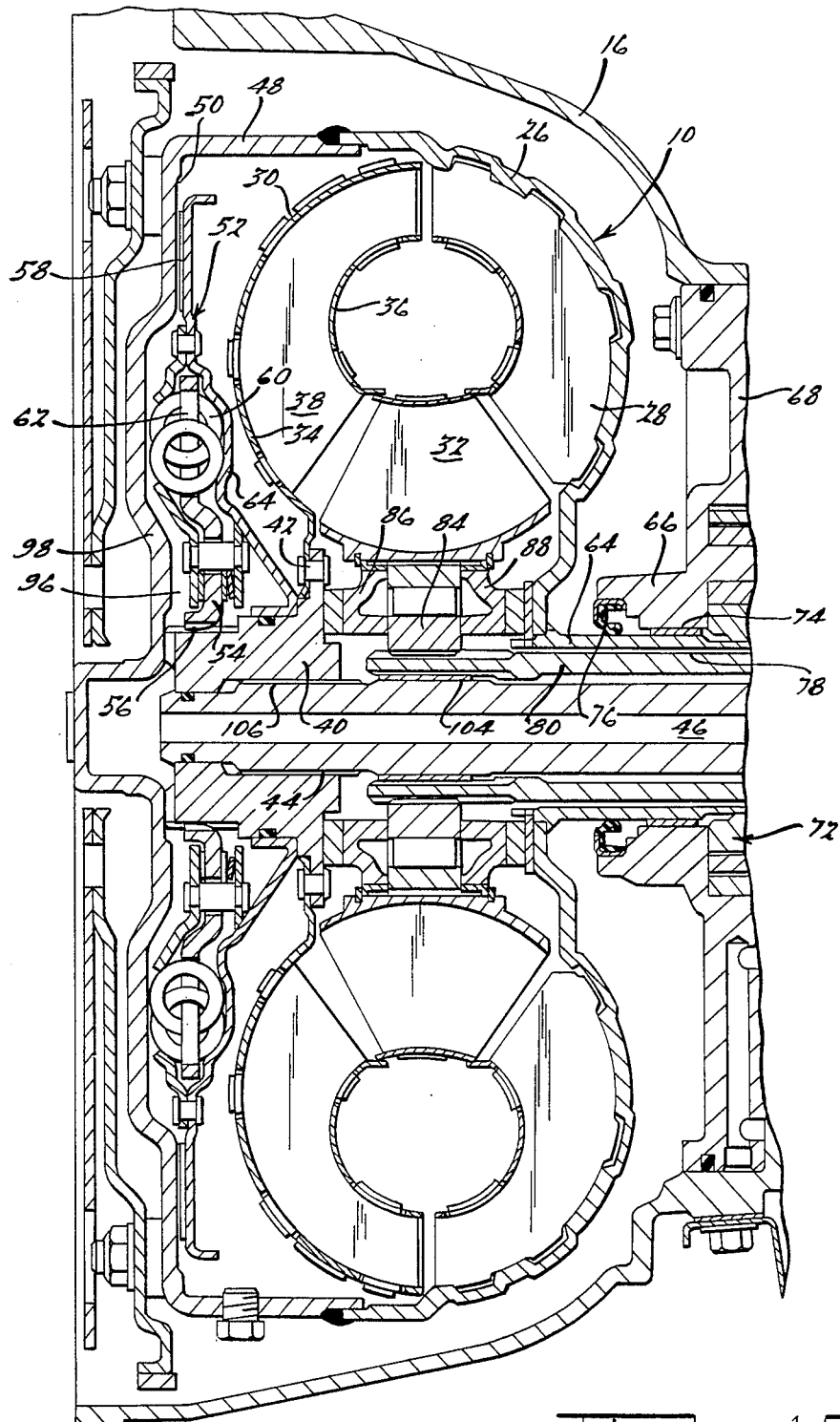
Figure 1B:
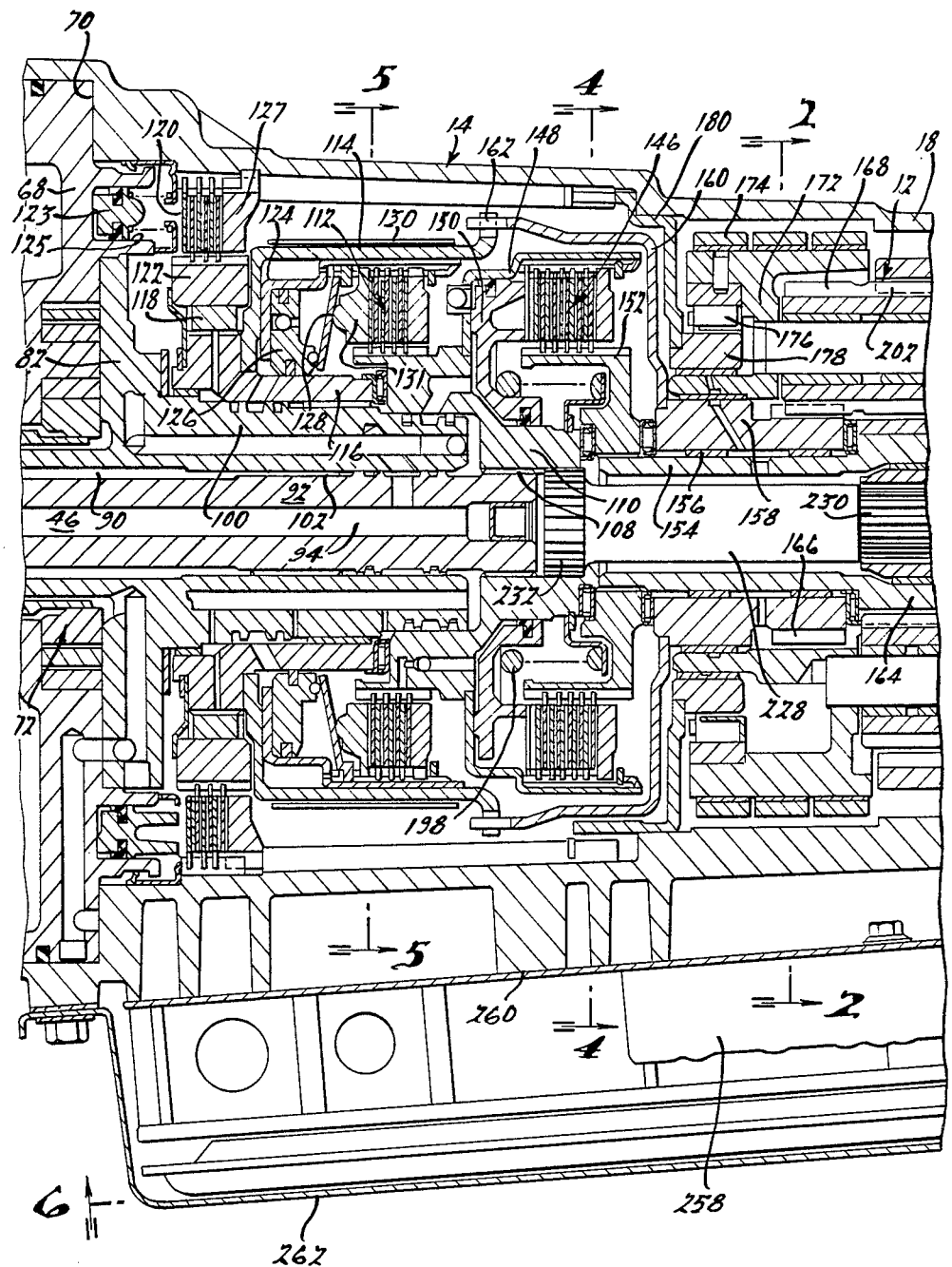

In FIG. 1A, numeral 10 designates a hydrokinetic torque converter and in FIG. 1B numeral 12 designates a compound planetary gear unit. The torque converter and the gear unit together with the clutches and brakes which will be described subsequently are enclosed in a common transmission housing 14 (reference numeral 14 is in FIG. 1B).

The housing 14 includes the torque converter bell housing portion 16 and a main transmission portion 18. A tailshaft housing 20 is secured by bolts 22 to the rear face 24 of the main housing portion 18.

Many of the features that will be described in the following specification are common to the disclosure of U.S. Pat. No. 4,347,765. Reference may be made to that patent to supplement this specification.

Torque converter 10 comprises an impeller housing 26 having a bladed portion carrying impeller blades 28 adapted to accommodate radial outflow of a hydraulic medium. The impeller cooperates with a bladed turbine 30 to define a torus flow circuit which includes, together with the impeller and the turbine, a bladed reactor 32 located between the flow exit section of the turbine and the flow entrance section of the impeller.

Turbine 30 comprises an outer shroud 34 and an inner shroud 36. Radial inflow blades 38 are disposed between the shrouds. The outer shroud 34 is connected to a turbine hub 40—for example, by rivets 42. The hub 40 is splined at 44 to a torque input shaft 46.

The impeller shell 26 is secured at its outer margin to an impeller housing portion 48. A radially disposed friction clutch surface 50 is formed in the impeller housing portion 48. A clutch piston and damper assembly 52 includes a hub 54 that is splined at 56 to the turbine hub 40. The outer margin of the assembly 52 includes a clutch disc 58 situated directly adjacent the friction surface 50. The disc 58 is connected to the hub 54 through a damper spring assembly 60.

When the disc 58 is engaged frictionally with the surface 50, impeller torque is transferred directly through the clutch, piston and damper assembly 52 to the splined hub 56, which in turn drives the input shaft 46 by reason of the splined connection 44.

For a description of a clutch, piston and damper assembly capable of being used in the environment of the transmission of FIG. 1 reference may be made to U.S. Pat. Nos. 4,304,107 and 2,574,573.

Hub 54 of the spring and damper assembly 52 has radial arms 62 which extend between tangentially spaced springs of the assembly 60. They are adapted to transfer torque between a spring and damper assembly housing 64 and the arm 62 so that torque can be transmitted through the spring and damper assembly in either direction.

The impeller shell has an impeller hub sleeve 64 which is journalled and supported by bearing support 66. This is part of a bearing support wall 68 which is secured by bolts to internal shoulder 70 (see FIG. 1B) of the main transmission housing portion 14. Sleeve 64 serves as a torque input drive sleeve shaft for driving the gear elements of a positive displacement gear pump 72 situated in a pump cavity in the wall 68.

Sleeve shaft 64 is journalled by bushing 74, and the shaft opening is sealed by lip seal 76. An annular converter feed passage 78 is defined by the sleeve shaft 64 and the stationary stator support shaft 80, which forms a part of bearing support wall 82 secured to the support wall 68. Bearing support wall 82 forms a cover for the pump cavity of pump 72.

Stator support sleeve shaft 80 is splined to the inner race 84 of an overrunning brake preferably in the form of a roller clutch for the stator 32. Spacers 86 and 88 are located between the hub 40 of the turbine and the overrunning brake and between the overrunning brake and the outer shroud for the impeller 26. Spacers 86 and 88 accommodate radial inflow and outflow of converter fluid to and from the aforesaid annular feed passage 78 and an annular flow passage 90 between stator support sleeve shaft 80 and a central torque input shaft 92. A central passage 94 formed in the shaft 92 provides for control pressure distribution of clutch control pressure to a clutch pressure chamber 96 located between the radially extending wall 98 of the impeller housing 48 and the clutch disc assembly 52. The magnitude of pressure in chamber 96 is modulated to effect a controlled slip of the friction surfaces, thus cushioning torque transfer from the engine crankshaft to the turbine shaft 46. Passage 94 as well as the annular passages 90 and 78 communicate with internal passages formed in the support wall 82 and stationary bearing sleeve shaft 100. The shaft 100 forms a part of the bearing support wall 82.

Shaft 92 is journalled in the support sleeve shaft 100 by bushing 102. At its opposite end shaft 92 is supported by bushing 104. The left hand end of the shaft 92 is splined at 106 to the hub 40 of the turbine.

The right hand end of the turbine driven shaft 92 is splined at 108 to clutch hub 110, which carries internally splined clutch discs of reverse clutch disc assembly 112. Externally splined discs of the assembly 112 are carried by brake drum 114 which is secured to clutch hub 116. Hub 116 forms an inner race for an overrunning brake 118, the outer race of which is adapted to be selectively braked by intermediate disc brake 120, the outer race being shown at 122.

The multiple disc brake 120 and 122 is applied by an annular piston 123 situated in an annular cylinder 125 formed in wall 68. Fluid pressure applied to the piston 123 creates a braking force on the friction discs as reaction ring 127 serves as a reaction point.

The hub 116 and the brake 114 define an annular clutch cylinder 124 in which is positioned annular clutch piston 126. When the working chamber defined by the cylinder 124 is pressurized, piston 126 actuates Belleville spring actuator 128 which applies clutch pressure to pressure plate 131, thus engaging the reverse clutch 112.

Overdrive brake band 130 surrounds the brake drum 114 and is adapted to be applied and released by a brake servo shown in FIG. 5. This brake servo includes a cylinder that forms a part of the transmission housing 18 as indicated at 132 in FIG. 5. The cylinder encloses a piston 134 having an actuator stem 136 extending through an opening in the transmission housing 18. It is adapted to engage the operating end 138 of the brake band 130.

The pressure chamber for operating the piston 134 is shown at 140.

The anchor point for the reaction end 142 of the brake band 130 is reaction pin 144 carried by the housing 18. Forward clutch assembly 146 includes a clutch cylinder 148 which is secured to clutch member 128. Forward clutch piston 150 is received in the clutch cylinder and it is adapted to act directly on the friction clutch discs of the clutch 146, which are carried by the clutch cylinder 148 and by an externally splined clutch member 152. Clutch member 152 is splined to sun gear shaft 154, which is journalled by bushings 156 in sun gear sleeve shaft 158. A torque transfer shell 160 is secured to the sun gear sleeve shaft 158 and is joined drivably to a brake drum 114 as shown at 162 in FIG. 1B. Sun gear sleeve shaft 154 and sun gear sleeve shaft 158 form a part of sun gear 164 and sun gear 166, respectively. These are a part of the planetary gear unit 12.

A long planet pinion assembly 168 drivably engages sun gear 166, which has the larger diameter of the two sun gears, and short planet pinion assembly 170 drivably engages sun gear 164. The planet pinion assemblies 168 and 170 drivably engage each other. Both are carried by a common planetary pinion carrier 172, which is journalled on the sun gear sleeve shaft 158.

The planetary carrier 172 forms a brake drum that is surrounded by low and reverse brake band 174, which has a well known, self-engaging, double wrap construction. An overrunning brake 176 has an outer race carried by the brake drum for brake band 174 and an inner race 178 that is connected to the transmission housing 18 through overrunning brake anchor member 180.

FIG. 2 shows a brake servo for operating the brake band 174. The servo includes a cylinder that forms a part of the transmission housing 18 as shown at 182. The servo includes a piston 184 located in the cylinder 182. The piston carries a brake actuating stem 186 that moves within a registering opening formed in the housing 18. Piston 184 is biased in a brake release direction by servo spring 188.

The stem 186 engages the operating 190 of the brake band 174. The reaction end of the brake band 174, which is seen at 192, engages reaction pin 194.

The piston 184 is subjected to a fluid pressure force by the fluid within the servo working chamber seen at 196. Both of the brake servos, as well as the servo for the clutch 146, are pressure applied and spring released. The release spring for the clutch 146 is a compression spring shown at 198. The release spring for the overdrive band servo is shown at 200 in FIG. 5, and the release spring for the reverse brake servo is the previously mentioned spring 188.

Planetary ring gear 202 engages long planet pinions 168. It is a part of a ring gear drum 204, which is splined at its right hand end to end plate 206. The plate 206 is splined at 208 to power output shaft 210 and is journalled in transmission end wall 212.

Shaft 210 has a reduced diameter portion that is received within a sleeve portion 214 of a direct and overdrive clutch cylinder 216 as seen in FIG. 1C. Sleeve 214 is a hub for the cylinder and it defines a pressure chamber in which is positioned direct and overdrive clutch piston 220. Direct and overdrive clutch member 222 carries splined clutch discs that register with clutch discs carried by clutch cylinder 216. A series of clutch release springs 218 is situated between a spring anchor 224 and is carried by the clutch cylinder.

The direct and overdrive clutch is designated generally by reference character 226. When it is applied, the carrier 172 becomes connected to the cylinder hub 214. An intermediate shaft 228 (see FIG. 1B) serves as a driving connection between the turbine driven shaft 36 and cylinder hub 214. Shaft 228 has a splined connection comprising external splines 230 on the right end of the shaft 228 which mesh with internal splines in the hub 214. That splined connection has a high dimensional tolerance, thus providing a loose spline drive.

The left end of the shaft 228 is externally splined at 232. Those splines register with internal splines in the clutch hub 110. That splined connection also has high dimensional tolerance to provide a loose spline drive. The driving connection between shaft 92 and the hub 110, on the other hand, is a close fit.

The loose splined connection between the left end of the shaft 228 and the hub 110 and the loose connection at 230 between the shaft 228 and the clutch hub 214 provides an articulated drivin connection that compensates automatically for any misalignment between the axis of the shaft 94 and the axis of the torque output shaft 210. Thus any undesirable radial bearing loads that might be caused by any misalignment is avoided. This facilitates assembly, manufacturing and machining operations and contributes to durability and to the elimination of undesirable noise and vibration during torque delivery.

In FIG. 4 I have shown in more detail the connection between the torque transfer member 180 and the housing 18. The member 180, as seen in FIG. 4, includes radially extending lugs 234 that are received in recesses 236 formed in the housing 18. A pocket 238, which is formed in the housing 18, receives a preload spring 240, one end of which engages one end of the pocket 238, as seen as 242, and the other end of which engages one of the lugs 234, as seen at 244. The spring 240 normally tends to bias the torque transfer member 180 in one direction thereby providing a preload that eliminates the backlash that normally would exist by reason of the loose connection between the projections 234 and the registering openings or recesses 236. Thus when the transmission is conditioned for low speed ratio operation, which requires the carrier to act as a reaction point, undesirable noise that would be created by shifting movement between the torque transfer member 180 and the housing 18 is prevented.

The torque transfer member 180 engages an adjacent shoulder on the housing 18 to hold it axially fast against movement in one direction. Movement in the opposite direction is prevented by snap ring 246 received in a snap ring groove in the housing 18, as best seen in FIG. 4.

FIG. 3 shows an accumulator that forms a part of a control valve circuit, not described in this specification. A similar accumulator, however, may be seen by referring to U.S. Pat. No. 4,347,765. It comprises a double diameter cylinder 248 which receives a double diameter piston 250. The piston and the cylinder define accumulator chambers 252 and 254 which cushion a 2-3 upshift as explained in the specification of patent '765. Piston 250 is biased by spring 256 to oppose the force of the accumulator pressure. The valve body 258, as seen in FIG. 1, is secured to a machined surface 260 at the base of the housing 18. An oil pan 262 surrounds the valve body 258 and is secured by bolts 264 to the surface 260. The oil pan 262 forms a sump for the transmission oil. Located in the sump is an oil screen 266 as seen in FIGS. 1 and 6.

Figure 7:
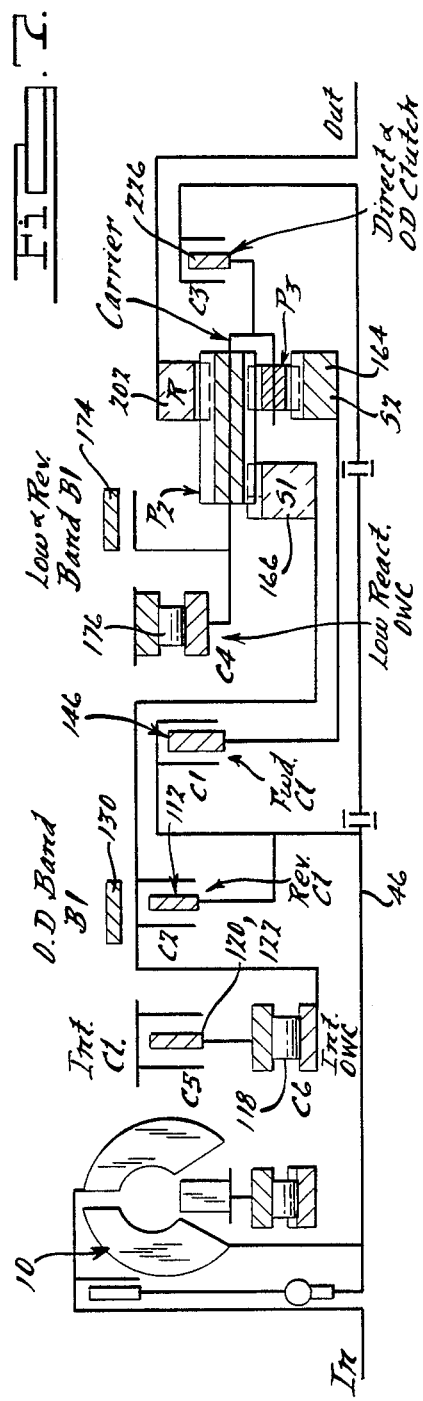
FIG. 7 a schematic representation of the converter, the clutches, the brake and the gearing of FIGS. 1A, 1B and 1C.
Figure 8:
FIG. 8 a chart showing the clutch and brake engagement and release pattern for establishing the various transmission ratios.

FIG. 8 shows a table that designates the clutch and brake engagement and release pattern for effecting the various drive ratios, which include four forward driving ratios and a reverse ratio. For the purpose of correlating the table of FIG. 8 with the cross-sectional drawing of FIGS. 1A, 1B and 1C, a schematic diagram of the transmission assembly is provided FIG. 7, wherein the clutches and brakes have been designated by reference characters corresponding to the characters used in FIG. 8. Thus the intermediate clutch is identified as C5. The intermediate overrunning clutch 118 is identified as overrunning clutch C6. The reverse clutch 112 is identified as clutch C2. The overdrive band 130 is identified as band B1. The forward clutch 146 is identified as clutch C1. The low reaction overrunning clutch 176 is identified as C4, the low and reverse band 174 is identified as band B2 and the direct and overdrive clutch is identified as clutch C3.

The first underdrive ratio can be achieved by using the low reaction clutch C4 or brake band B2. If brake band B2 is applied, coast braking is possible in low ratio. The transmission control system, as described in U.S. Pat. No. 4,347,765, will cause the transmission to operate continuously in low ratio with no automatic upshifts. If the normal forward drive mode is desired, clutch C4 is relied upon to provide a reaction point and brake band B1 is not applied. That condition is indicated by the symbol D in the table of FIG. 8 whereas the previous condition is indicated as M, indicating manual, low ratio operation.

During operation in each of the first three forward drive ratios, clutch C1 is applied, thus providing a driving connection between the turbine driven shaft 46 and the small diameter sun gear 164. With the carrier acting as a reaction point and the sun gear 164 acting as a torque input element, the ring gear 202 and the output shaft are driven with a torque multiplication ratio of 2.4:1.

To effect a ratio change to the second speed ratio, clutch C5 is applied thereby anchoring the large diameter sun gear 166. Thus the ring gear 202 and the output shaft are driven with a reduced multiplication ratio of 1.46721.

A direct drive ratio of 1.1 is achieved by engaging simultaneously a direct and overdrive clutch C3 as the clutch C1 remains applied. This locks together all of the elements of the planetary gear unit for rotation in unison. Clutch C6 overruns thus allowing clutch C5 to remain applied although it is nonfunctional in the third, direct drive ratio.

Fourth ratio, which is an overdrive ratio of 0.667:1, is achieved by engaging the brake band B1 and releasing clutch C1 while clutch C3 remains applied. Thus the sun gear 166 acts as a reaction member as the ring gear 202 and the output shaft are overdriven.

Reverse drive is achieved by engaging brake B1 and clutch C2. Thus the carrier is anchored so that it may serve as a reaction point, and sun gear 166 acts as a torque input element as clutch C2 delivers turbine torque from shaft 46 through the clutch C2.

Having described a preferred embodiment of our invention, what we claim and desire to secure by U.S. letters patent is:

1. In a multiple ratio planetary transmission having a hydrokinetic torque converter and a compound planetary gear unit, said converter having a bladed turbine and an engine driven bladed impeller;

said gear unit comprising a large diameter sun gear, a small diameter sun gear, a compound carrier supporting a set of long planet pinions and a set of short planet pinions that are in meshing relationship, a ring gear engaging said long planet pinions, the short planet pinions engaging said small diameter sun gear, said large diameter sun gear engaging said long planet pinions;

a driven shaft connected to said ring gear, a direct and overdrive clutch having its torque input side connected to said carrier, said direct and overdrive clutch being located between said planetary gear unit and said driven shaft on one side of said planetary gear unit;

a forward clutch and a reverse clutch located between said torque converter and said planetary gear unit, the torque output side of said forward clutch being connected to said small diameter sun gear, the torque output side of said reverse clutch being connected to said large diameter sun gear;

a turbine driven shaft disposed concentrically with respect to said converter and said gear unit, a torque delivery sleeve shaft connected to the torque input side of said direct and overdrive clutch; and an intermediate shaft connecting said sleeve shaft with said turbine driven shaft, said intermediate shaft having driving connections at its opposite ends with said turbine driven shaft and said sleeve shaft, said driving connections having engaging portions with a large dimensional tolerance thereby accommodating a slight articulation of said intermediate shaft to compensate for misalignment between the axes of said sleeve shaft and said turbine driven shaft.

2. In a multiple ratio planetary transmission having a hydrokinetic torque converter and a compound planetary gear unit, said converter having a bladed turbine and an engine driven bladed impeller;

said gear unit comprising a large diameter sun gear, a small diameter sun gear, a compound carrier supporting a set of long planet pinions and a set of short planet pinions that are in meshing relationship, a ring gear engaging said long planet pinions, the short planet pinions engaging said small diameter sun gear, said large diameter sun gear engaging said long planet pinions;

a driven shaft connected to said ring gear, a direct and overdrive clutch having its torque input side connected to said carrier, said direct and overdrive clutch being located between said planetary gear unit and said driven shaft on one side of said planetary gear unit;

a forward clutch and a reverse clutch located between said torque converter and said planetary gear unit, the torque output side of said forward clutch being connected to said small diameter sun gear, the torque output side of said reverse clutch being connected to said large diameter sun gear;

a turbine driven shaft disposed concentrically with respect to said converter and said gear unit, a torque delivery sleeve shaft connected to the torque input side of said direct and overdrive clutch;

an intermediate shaft connecting said sleeve shaft with said turbine driven shaft, said intermediate shaft having driving connections at its opposite ends with said turbine driven shaft and said sleeve shaft, said driving connections having engaging portions with a large dimensional tolerance thereby accommodating a slight articulation of said intermediate shaft to compensate for misalignment between the axes of said sleeve shaft and said turbine driven shaft; and a slipping converter bypass clutch means for establishing a mechanical torque delivery path between said impeller and said turbine to complement a hydrokinetic torque deliver path between said engine and said turbine driven shaft.

3. The combination as set forth in claim 1 wherein the connection between one end of said intermediate shaft and said turbine driven shaft comprises a clutch sleeve having internal splines forming a part of a torque input element of said forward clutch, spline teeth on said intermediate shaft meshing with spline teeth on said turbine driven shaft with a close fit and external spline teeth on said intermediate shaft meshing with said internal spline teeth with a high tolerance fit.

4. The combination as set forth in claim 1 wherein the connection between one end of said intermediate shaft and said turbine driven shaft comprises a clutch sleeve having internal splines forming a part of a torque input element of said forward clutch, external spline teeth on said intermediate shaft meshing with internal spline teeth on said turbine driven shaft with a close fit and external spline teeth on said intermediate shaft meshing with said internal spline teeth with a high dimensional tolerance fit.

5. The combination as set forth in claim 3 wherein said transmission includes:
   a slipping converter bypass clutch means for establishing a mechanical torque delivery path between said impeller and said turbine to complement a hydrokinetic torque deliver path between said engine and said turbine driven shaft.

6. The combination as set forth in claim 4 wherein said transmission includes:
   a slipping converter bypass clutch means for establishing a mechanical torque delivery path between said impeller and said turbine to complement a hydrokinetic torque deliver path between said engine and said turbine driven shaft.

* * * * *

UNITED STATES PATENT AND TRADEMARK OFFICE
CERTIFICATE OF CORRECTION

PATENT NO. : 4,934,216

DATED : June 19, 1990

INVENTOR(S) : Joseph L. Sandel et al

It is certified that error appears in the above-identified patent and that said Letters Patent is hereby corrected as shown below:

```
Title - after "TRANSMISSION" insert --WITH--.

Abstract, Line 15
"portion" should be --portions--.

Column 2, Line 36
after "to" insert --the third--.

Column 2, Line 39
after "antibacklash" insert --spring and--.

Column 2, Line 46
after "of" insert --the transmission--.

Column 5, Line 64
"drivin" should be --driving--.

Column 6, Line 52
after "provided" insert --in--.
```

UNITED STATES PATENT AND TRADEMARK OFFICE
CERTIFICATE OF CORRECTION

PATENT NO. : 4,934,216

DATED : June 19, 1990

INVENTOR(S) : Joseph L. Sandel et al

It is certified that error appears in the above-identified patent and that said Letters Patent is hereby corrected as shown below:

Column 8, Line 55, Claim 2, "deliver" should be --delivery--.

Signed and Sealed this

First Day of October, 1991

Attest:

*Attesting Officer*

HARRY F. MANBECK, JR.

*Commissioner of Patents and Trademarks*